United States Patent Office 3,235,314
Patented Feb. 15, 1966

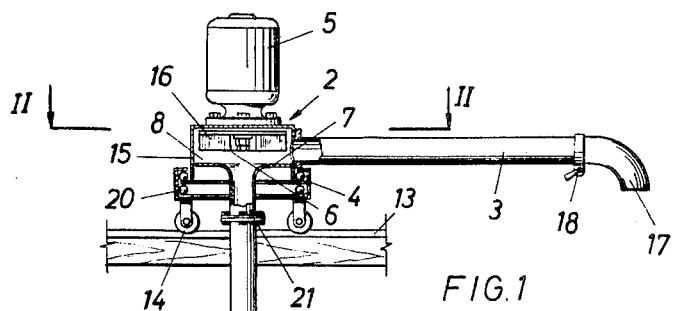
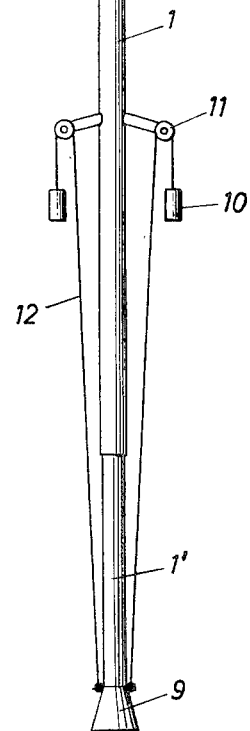
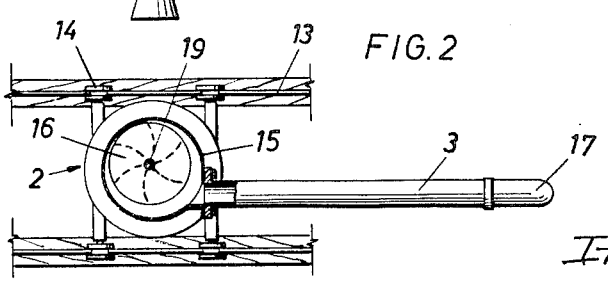

3,235,314
PNEUMATIC CONVEYOR FOR EASILY CLOGGING FIBROUS AGRICULTURAL CROPS
Hermann Schorer, Weicht 2, District of Kaufbeuren, Germany, assignor to Firm Franz Hacker G.m.b.H., Kaufbeuren, Germany
Filed Nov. 26, 1962, Ser. No. 240,059
Claims priority, application Germany, Dec. 1, 1961, H 44,287
19 Claims. (Cl. 302—17)

The invention relates to a pneumatic conveyor for easily clogging, fibrous agricultural harvested material, comprising a radial blower, to the housing of which there are connected both a substantially straight suction pipe and a pressure pipe.

In the art of pneumatic conveyance, a device for discharging chaff is known comprising a radial blower having a horizontally mounted impeller shaft, and a substantially horizontal and straight suction pipe directly connected to the blower without any cutter being interposed for the material to be conveyed. Also connected to the blower is a pressure pipe which extends vertically at least in its front portion—as seen in the direction of flow—which serves to convey the material vertically and then horizontally for the major part of the distance between the place where the material is loaded onto the conveyor and the place where it is discharged. With this conveyor, if the material is discharged horizontally from the end of the pressure pipe, the conveying air stream has to be deflected through 90° outside the end of pressure pipe. Also if the material is discharged by dropping, the air stream again must be deflected through 90°.

If the feed performance is suddenly reduced (through the current failing or being disconnected during the conveying operation), the material may drop back from the vertical part of the pressure pipe into the blower and clog it.

Also known is a suction air conveyor for raising ground material out of milling machines where the flow of material is sharply diverted at the loading station then, after a vertical stretch of suction pipe, the conveying air stream is further deflected through 90°, after which the material conveyed is separated by the suction air in a cutter. The suction is finally led on from the cutter with numerous additional deflections. If this suction air conveyor were used for easily clogging, fibrous agricultural harvested materials, the numerous bends and horizontal stretches in the pipes would make it very liable to clogging and also very expensive to construct. Moreover if it were put to this use it would also be too expensive for routine operation, for in view of the high air throughput required for such application the numerous deflections of the flow path outside the blower would cause too great a pressure loss.

Finally, another suction air conveyor is known, where the suction pipe—looked at in the direction of flow—runs vertically or substantially vertically in the first part of its course but horizontally after the conveying air stream has been deflected through 90°. If this installation were applied to the problem of the invention, the 90° deflection in the suction pipe would make it structurally too expensive, the loss of pressure would make it too dear to operate and the horizontal stretch of suction pipe would make it extremely liable to clogging.

One object of the invention is to provide a simple, reliably operating pneumatic conveyor for easily clogging, fibrous harvested material.

A further object is to improve known pneumatic conveyors for easily clogging, fibrous agricultural harvested materials.

Another object is to achieve a considerable reduction in the space required at loading level by pneumatic conveyors for such materials.

A further object of the invention is to keep to a minimum the amount of pressure lost in the conduits of such a pneumatic conveyor, thereby reducing the power requirement of the radial blower.

Yet another object is to diminish the danger of clogging and to achieve this with a much smaller technical outlay than is required for known pneumatic conveyors for easily clogging, fibrous agricultural harvested material.

A final object of the invention is to ensure that when the conveyor is used the harvest carts to be unloaded can be parked without adjusting the existing horizontal threshing floor and without keeping to any specific direction.

According to the invention, the suction pipe extends vertically or substantially vertically downwards from the blower housing and the shaft of the impeller of the blower is mounted vertically or substantially vertically in the blower housing.

This construction enables the radial blower to be mounted where there is space available for it, namely in the roof timbers of the barn, or in any case above the cart to be unloaded or the otherwise supplied material. It also enables the suction pipe to lead directly upwards from the material to be conveyed. Compared to known apparatus for unloading chaff, where the suction pipe and blower take up a considerable part of the threshing floor or farmyard and are a great hindrance to the shunting of the carts, and where the conveyor may become clogged by an excessive load of material, due to the suction pipe being arranged dropping along a short stretch, the conveyor according to the invention therefore has the important advantages that it takes up no space at all on the level where the material is loaded, that the carts to be unloaded can be shunted unimpeded under the suction pipe and that, even if the feed performance is suddenly reduced, the conveyor does not become clogged, since in this case the material in the suction pipe drops back to the loading station.

The fact that according to the invention the pressure pipe adjoining the outer surface of the blower housing is either downwardly inclined or horizontal or rises through an angle of up to 15° enables the deflections in the conveying air stream to be reduced to the unavoidable minimum outside the radial blower. In the case of horizontal ejection and provided that no deflections are needed in the horizontal plane through the blower, this minimum is—according to the invention—zero. Under the same conditions a known device for discharging chaff has at least one deflection of 90° in the pressure pipe. If the material is discharged vertically downwards, the pressure conduit according to the invention has at least one deflection through 90°, whereas the known device for discharging chaff has at least two deflections through 90°.

Compared to the known device for discharging chaff, the construction according to the invention thus in any case has the further important advantage of needing less driving power for the radial blower and, due to the elimination of deflections which are always a danger point from the point of view of clogging, of lessening the danger of clogging. This is also due to the fact that, when the pressure pipe is arranged in accordance with the invention, no material can move back from the pressure pipe into the blower if the feed performance is suddenly reduced.

It is clear that this is all achieved not with a greater but with a lesser structural outlay than is required for known devices for unloading chaff, for any reduction in the number of deflections in the conveying conduits represents a considerable saving on construction.

An example of the conveyor according to the invention is given below with reference to the drawing, which is greatly simplified. In the drawings:

FIG. 1 is a side elevation of the conveyor according to the invention with the blower in section and FIG. 2 is a plan view of the blower along the line II—II.

Following the direction of flow of the conveying air, the conveyor shown in FIG. 1 comprises a suction nozzle 9, a multi-part suction pipe 1, 1', a radial blower 2 with drive motor 5, a turntable 4, runners 14 and runway rails 13. Of course the radial blower 2 may alternatively hang from runners and runway rails in the manner of an overhead trolley. Fixed to the outer surface of the blower housing 15 is a pressure pipe 3, the front end of which is equipped with a rotary ejection nozzle 17. The nozzle 17 can be fixed in position as desired by means of a setscrew 18, in order to set a specific direction of discharge. The suction pipe 1 is flanged and bolted onto the blower 2 at 21. The pressure pipe 3 may be mounted on the blower housing 15 either downwardly inclined, or horizontally or rising through an angle of up to 15°.

In the example shown the blower housing 15 acts as a carrier for the suction and pressure pipe (1 and 3). It is also possible, however, to provide separate supporting members for the suction pipe and the pressure pipe in the region of the housing.

The radial blower 2 has an impeller 16. The shaft 19 of the impeller 16 is mounted vertically or substantially vertically in the blower housing 15, substantially parallel to the direction of the suction pipe 1. The impeller 16 in the blower housing 15 is positioned eccentrically from the latter as shown in FIG. 2. The lower edges 6 of the vanes of the impeller 16 are positioned above the lower member or base of the housing so as to leave an interval or gap 8 between them and the inside 7 of the base of the housing. The width of the gap 8 may be equal to at least half the delivery width of the vanes.

The blower housing 15, together with the pressure pipe 3 mounted thereon, is rotatable on the turntable 4 about the vertical central shaft of the radial blower 2. For this purpose the turntable 4 is provided with ball bearings 20. The runners 14, supported on the runway rails 13, enable the conveyor to be moved horizontally.

The conveyor (see FIG. 1) is also provided with a known device for adjusting the height of the lower piece of suction pipe 1', which is movable in telescope fashion in the suction pipe 1. This device comprises cables 12 which are attached by one end to the piece of suction pipe 1', pass through rollers 11 and are provided at the other end with counterweights 10. The weight of the piece of suction pipe 1' including that of the suction nozzle 9 is balanced by the counterweights 10, so that the lower piece of suction pipe 1' is automatically held at any height by friction.

The embodiments of the invention in which an exclusive property or privilege is claimed are defined as follows:

1. A pneumatic conveyor for easily clogging fibrous crops comprising a drive motor, a radial blower having a blower housing, an impeller and an impeller shaft, said drive motor being connected to said radial blower and adapted to drive said blower, a suction pipe and a pressure pipe, said suction pipe and said pressure pipe being connected to said blower housing, the main axis of said suction pipe extending in one substantially straight line in a substantially vertical direction from said blower housing downwards to said crops, said impeller shaft extending substantially vertically in said blower housing in substantially parallel relation to said main axis, means to adjust the length of said suction pipe to the level of said crops and means for supporting said blower above said crops at a distance corresponding substantially to the length of said suction pipe.

2. A pneumatic conveyor according to claim 1, wherein said pressure pipe is inclined downwardly from said blower housing.

3. A pneumatic conveyor according to claim 1, wherein said pressure pipe is inclined upwardly from said blower housing, at an angle of up to 15° to the horizontal.

4. A pneumatic conveyor according to claim 1, wherein said pressure pipe extends substantially horizontally from said blower housing.

5. A conveyor according to claim 1, said blower housing together with said pressure pipe fixed thereto being mounted rotatably about said main axis with respect to said supporting means.

6. A conveyor according to claim 5, wherein said pressure pipe extends substantially horizontally from said blower housing.

7. A conveyor according to claim 1, wherein said supporting means are horizontally movable together with said blower and drive motor, said pressure pipe and said suction pipe.

8. A conveyor according to claim 7, wherein said horizontally movable supporting means are provided with rollers and rails supporting said rollers.

9. A conveyor according to claim 7, wherein said pressure pipe extends substantially horizontally from said blower housing.

10. A conveyor according to claim 1, wherein said impeller has substantially radially extending vanes, lower edges of said vanes and the interior surface of the bottom of said blower housing defining a gap the width of which corresponds to at least half the distance between subsequent vanes at the periphery of said impelled.

11. A conveyor according to claim 10, wherein said pressure pipe extends substantially horizontally from said blower housing.

12. A conveyor according to claim 11, wherein said blower housing together with said pressure pipe fixed thereto is mounted rotatably about said main axis with respect to said supporting means.

13. A conveyor according to claim 11, wherein said supporting means are horizontally movable together with said blower and drive motor, said pressure pipe and said suction pipe.

14. A conveyor according to claim 13, wherein said blower housing together with said pressure pipe fixed thereto is mounted rotatably about said main axis with respect to said supporting means.

15. A conveyor according to claim 14, wherein said means to adjust the length of said suction pipe are constituted by an upper and a lower section, said sections being telescopically slidable in relation to each other, the lower end of said lower section being provided with a suction nozzle.

16. A conveyor according to claim 1, wherein said means to adjust the length of said suction pipe are constituted by an upper and a lower suction pipe section, said sections being telescopically slidable in relation to each other, the lower end of said lower section being provided with a suction nozzle.

17. A pneumatic conveyor according to claim 16, wherein the weight of said lower section together with said suction nozzle is balanced by counterweights through cables and rollers, so that said lower section is automatically held at any height by friction.

18. A conveyor according to claim 16, wherein said pressure pipe extends substantially horizontally from said blower housing.

19. A pneumatic conveyer according to claim 18, wherein the weight of said lower section together with said suction nozzle is balanced by counterweights through cables and rollers, so that said lower section is automatically held at any height by friction.

References Cited by the Examiner

UNITED STATES PATENTS

| | | | |
|---|---|---|---|
| 713,129 | 11/1902 | Milne | 302—58 |
| 891,191 | 6/1908 | Shinn et al. | 302—59 |
| 1,064,291 | 6/1913 | Conrad | 302—58 |
| 1,110,104 | 9/1914 | Blessing | 302—58 |
| 1,331,007 | 2/1920 | Feick | 302—37 |
| 1,400,658 | 12/1921 | Brown | 302—58 |
| 1,844,065 | 2/1932 | Heintz et al. | 302—37 |
| 1,900,213 | 3/1933 | Wenberg | 302—37 |
| 2,678,241 | 5/1954 | Miller | 302—56 |

HUGO O. SCHULZ, *Primary Examiner.*

ANDRES H. NIELSEN, SAMUEL F. COLEMAN,
*Examiners.*